United States Patent [19]

Smith et al.

[11] 4,344,908
[45] Aug. 17, 1982

[54] PROCESS FOR MAKING POLYMER FILAMENTS WHICH HAVE A HIGH TENSILE STRENGTH AND A HIGH MODULUS

[75] Inventors: Paul Smith, Sittard; Pieter J. Lemstra, Brunssum, both of Netherlands

[73] Assignee: Stamicarbon, B.V., Geleen, Netherlands

[21] Appl. No.: 119,045

[22] Filed: Feb. 6, 1980

[30] Foreign Application Priority Data

Feb. 8, 1979 [NL] Netherlands .......................... 7900990

[51] Int. Cl.³ ................................................ D01F 6/00
[52] U.S. Cl. ............................... 264/203; 264/204; 264/205; 264/290.5; 528/502
[58] Field of Search .................. 264/184, 210.8, 210.4, 264/204, 205, 203, 290.5; 528/502

[56] References Cited

U.S. PATENT DOCUMENTS

| 362460 | 4/1943 | Berg et al. ........................... 264/343 |
| 2,979,774 | 4/1961 | Rusignolo ........................... 264/343 |
| 3,441,640 | 4/1969 | Santeangelo ........................ 264/203 |
| 3,449,485 | 6/1969 | Costa et al. .......................... 264/203 |
| 3,737,504 | 6/1973 | Herrbach et al. .................... 264/343 |
| 3,742,104 | 6/1973 | Jamison et al. ...................... 264/343 |
| 4,020,230 | 9/1977 | Mahoney et al. ................. 264/289.6 |
| 4,137,394 | 1/1979 | Meihuizen et al. ................. 528/502 |
| 4,205,038 | 5/1980 | Brydon ................................ 264/184 |

FOREIGN PATENT DOCUMENTS

| 37-9765 | 7/1962 | Japan ................................... 264/211 |
| 50-62258 | 5/1975 | Japan ..................................... 264/28 |
| 50-62273 | 5/1975 | Japan .................................. 264/184 |
| 52-12325 | 1/1977 | Japan .................................. 264/184 |

*Primary Examiner*—Jay H. Woo

[57] ABSTRACT

A process for making polymer filaments which have a high tensile strength and a high modulus by stretching a polymer filament which contains an appreciable amount of polymer solvent at a temperature between the swelling point and the melting point of the polymer.

8 Claims, 3 Drawing Figures

PROCESS FOR MAKING POLYMER FILAMENTS WHICH HAVE A HIGH TENSILE STRENGTH AND A HIGH MODULUS

BACKGROUND OF THE INVENTION

The present invention relates to polymer filaments which have a high tensile strength and a high modulus, and to a process for making such filaments.

Filaments are usually made by spinning linear polymers. A polymer is first made into a liquid such as a melt or a solution and is then spun forming a filament. Although other substances are capable of being spun the chain formation of the macromolecules is an important consideration as side branches have an adverse effect on filament formation and mechanical properties. Therefore, the production of filaments in accordance with the process of the present invention is premised on the use of linear polymers although a limited degree of branching is usually unavoidable and will have to be accepted.

The randomly oriented chains of molecules in this filament must next be oriented lengthwise in the filament which is accomplished by stretching.

Stretching of the filament results in orienting the chain macromolecules lengthwise which also increases the strength of the filaments. However, in many cases the strength of the stretched filaments is still far below the value that is theoretically expected. Many attempts have already been made at producing filaments with a tensile strength and a modulus closer to what are theoretically possible. These attempts, of which a survey is given in publications by Juyn in Plastica 31 (1978) 262-270 and Bigg in Polymer Eng. Sci. 16 (1976) 725-734, have failed to yield satisfactory results. In a number of cases the modulus ws improved sufficiently, but not the tensile strength. There was an additional drawback in that the filament formation was so slow that economic production would be impossible.

It has now been found that polymer filaments which have a high tensile strength and a high modulus can be made by stretching a polymer filament containing an appreciable amount of polymer solvent at a temperature between the swelling point and the melting point of the polymer. Preferably a spinnable solution is spun by any of the known methods, the resultant filament is cooled to below the solution temperature of the polymer, the temperature of the filament is then adjusted at a value between the swelling point of the polymer in the solvent and the melting point of the polymer, and the filament is then stretched.

In the dry spinning process which is widely applied on a technical scale, a solution of a spinnable polymer is spun in a shaft through which air is blown to evaporate all or mosts of all of the solvent to form the filament. While the air is usually heated the temperature in the shaft is kept below the melting point of the polymer in order to increase the mechanical strength of the filament, which is very low as it exits the spinning aperture.

The mechanical strength can be further increased in the subsequent stretching step at temperatures below the melting point of the polymer.

DESCRIPTION OF THE INVENTION

According to the present invention, the evaporation of the solvent from the filament immediately after spinning is not promoted during the cooling phase. The filament can be cooled to below the solution temperature, and particularly to below the swelling point of the polymer in the solvent by any suitable way, including for example, by passing the filament through a water bath, or through a shaft without any air or only minimal amounts of air being blown through the shaft. Some evaporation of the solvent from the filament will often take place spontaneously and cannot be prevented. This is acceptable as long as the evaporation is not actively promoted and the amount of solvent in the filament is not reduced to a low value, e.g., to less than 25% by weight of solvent relative to the polymer. Preferably the amount of solvent will not be less than equal amounts by weight of solvent and polymer. If desired, the evaporation of the solvent may be reduced or suppressed by carrying out the spinning in an atmosphere containing solvent vapor.

In cooling to below the solution temperature, in particular to below the swelling temperature of the polymer in the solvent, the polymer precipitates from the solution, and a gel is formed. A filament consisting of this polymer gel has sufficient mechanical strength for further processing, for example, by means of the guides, rolls, and the like customarily used in spinning techniques. A filament of this kind is heated to a temperature between the swelling point of the filament in the solvent and the melting point of the polymer, and is then stretched at that temperature. This can be effected by passing the filament into a zone containing a gaseous or liquid medium kept at the required temperature. A tubular oven with air for the gaseous medium is very suitable, but it is also possible to use a liquid bath or any other suitable device. A gaseous medium is easier to handle, and is therefore preferable.

When the filament is being stretched in a gaseous medium, solvent evaporation will occur. If a liquid medium is used, there will be dissolution of the solvent in the liquid. Preferably, the evaporation is promoted by suitable means such as removal of the solvent vapor, by for instance leading a gas or air current past the filament in the stretching zone. At least part of the solvent should be evaporated, but preferably at least the greater part of the solvent is evaporated, so that by the end of the stretching zone there will be at most only a small amount, e.g., not more than a few percent, calculated on a solid-substance basis of solvent contained in the filament. The filament which is eventually obtained must be free of solvent, and it is advantageous to apply such conditions that it is free, or virtually free, of solvent by the time it exits from the stretching zone.

Surprisingly, the process in accordance with the percent invention can produce filaments that are considerably stronger, i.e. are filaments with considerably higher tensile strength and higher modulus than filaments of the same material made by any of the usual dry spinning processes. By means of the methods described in the above-mentioned publications by Juyn and Bigg filaments of higher modulus have been obtained, but the tensile strength is still unacceptable. Moreover, the productivity of these methods is low.

The process in accordance with the present invention differs from the usual dry spinning processes in that a filament containing an appreciable amount of solvent is stretched with removal of solvent at a temperature at which the spinnable material will at least swell in the solvent, whereas in the usually applied spinning processes solvent free filaments are subjected to stretching.

One requirement of dry spinning is that the linear polymer be soluble in a suitable solvent. For any given soluble polymer a number of different solvents are available. A suitable solvent is one with a boiling point not too high so that it will not be difficult for the solvent to be evaporated from the filament, and not too low so that it is not too volatile and thus hinder filament formation because of rapid evaporation. Also, if it is too volatile, it may have to be processed under pressure to prevent rapid evaporation.

Dissolution of a polymer in a suitable solvent involves swelling. While the solvent is being absorbed and the volume increases, a swollen gel is formed, which, however, because of its consistency and stability of shape is still regarded as a kind of solid substance. It is generally assumed that the polymer is composed of ordered or crystalline areas and less ordered or amorphous areas. The ordered areas are believed to act as anchoring points and thus lend stability of shape to the gel. The formation of the gel and the dissolution are time dependent. A given polymer can be dissolved in a given solvent only above a given temperature. Below this solution temperature only swelling takes place, and according as the temperature is lowered, the swelling becomes less, until at a certain temperature the swelling will be negligible. The swelling point or swelling temperature is considered to be that temperature at which a distinct increase in volume and a distinct absorption of solvent in an amount of about 5 to 10% of the polymer weight occur. A simple rule of thumb is that the swelling temperature above which the stretching is to be effected is the temperature at which 10% of solvent is unquestionably absorbed into the swelling polymer.

In dry spinning processes usually 5-30% wt. solutions are used for technical and economic reasons. Such solutions are also suitable for the process of the present invention, although generally solutions of lower concentration may be used. Solutions in the range of about 1 to 5% by weight of polymer to solvent can be advantageously used while still lower concentrations can be used at times but these do not present advantages and are economically disadvantageous.

Suitable stretching ratios can be easily determined by experiment. Tensile strength and modulus of the filaments are, within certain limits, about proportional to the stretching ratio. Accordingly as the filaments are to be stronger, a greater stretching ratio will have to be selected.

The stretching ratio is at least 5, by preference at least 10, and more in particular at least 20. High stretching ratios such as 30 to 40 and even higher can be applied without objection, and will result in filaments whose tensile strength and modulus are apprecibly higher than those of filaments made by the usual dry spinning processes.

In dry spinning processes the diameters of the spinning apertures in the spinning nozzles are usually small. In general, these diameters range from about 0.02 mm to about 1.0 mm. When small spinning apertures of less than about 0.2 mm are used, the spinning process is highly sensitive to the presence of impurities in the spinning solution. Therefore the spinning solution should be carefully freed and kept free of solid impurities. In most cases, filters are placed on the spinning nozzles, but regardless the spinning nozzles need to be cleaned after a short time, and blockage still occurs frequently. One significant advantage of the process of the present invention is that larger spinning apertures can be used. Spinning apertures of for example about 0.5 mm to 2.0 mm or larger can be used because considerably higher stretching ratios can be applied and, additionally, generally lower polymer concentrations in the spinning solution are used.

The process of the present invention has a wider application and can be used in general for any materials that can be dry spun to filaments.

Polymers that can be spun by the process according to the present invention are, for instance, polyolefins such as polyethylene, polypropylene, ethylene-propylene copolymers, polyoxymethylene, polyethylene oxide; polyamides, such as the various types of nylon; polyesters, such as polyethyleneterephtalate, polyacrylonitrile; vinyl polymers such as polyvinylalcohol, polyvinylidenefluoride.

Polyolefins such as polyethylene, polypropylene, ethylene-propylene copolymers and higher polyolefins can without objection be dissolved in hydrocarbons such as saturated aliphatic and cyclic hydrocarbons as well as aromatic hydrocarbons, or mixtures thereof such as mineral oil fractions. Very suitable are aliphatic or cyclic hydrocarbons such as nonane, decane, undecane, dodecane, tetralin, decalin, etc., or mineral oil fractions corresponding in boiling range. Polyethyelene or polypropylene is preferably dissolved in decalin or dodecane. The present method is particularly suitable for the preparation of filaments of polyolefins, preferably polyethylene.

It is also possible to make filaments of solutions of two or more polymers in a common solvent by the present process. For this purpose the polymers need not be miscible with each other. For instance, it is possible to dissolve together in decalin or dodecane polyethylene and polypropylene whose melts are immiscible, and to spin the solutions thus obtained.

The filaments according to the invention can be used for many purposes. They can be applied as reinforcement in many kinds of materials for which reinforcement with fibers or filaments is known, such as tire yarns, and for all possible applications in which low weight combined with high strength is a desirable feature.

DETAILED DESCRIPTION OF THE DRAWING

Figure 1:
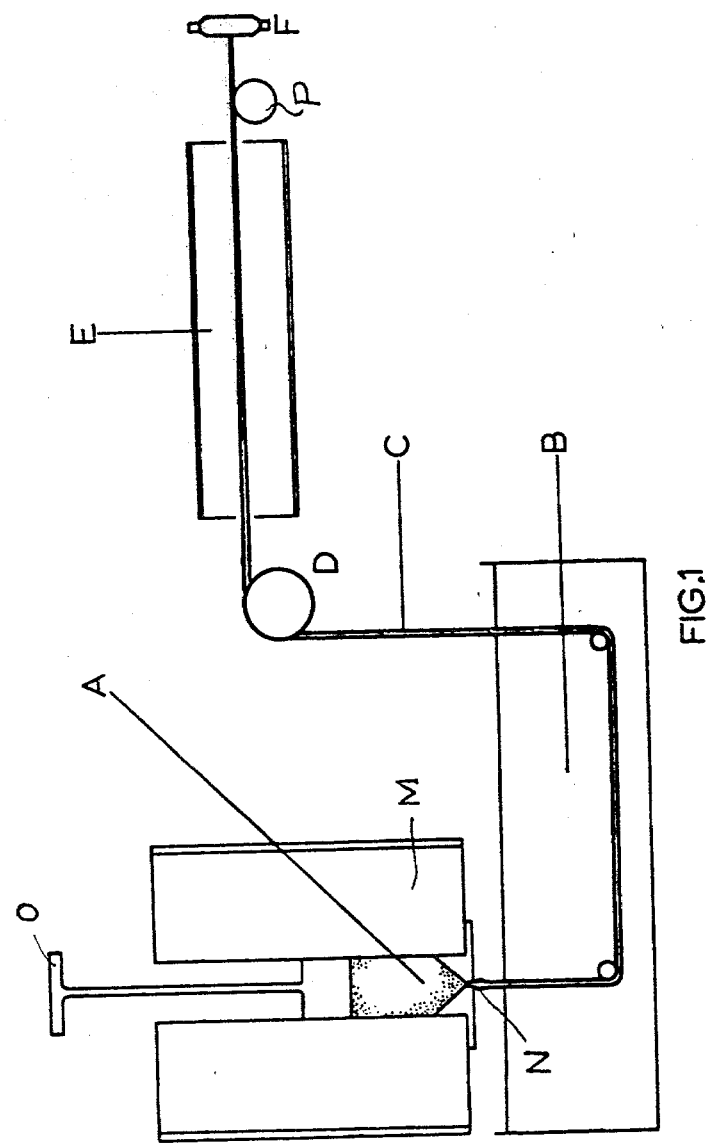
FIG. 1 is a schematic drawing of the embodiment of the present invention set forth in Example I below.

FIG. 1 is a schematic representation of the apparatus and process employed to make the filaments described in Example I below.

A is a solution of a polymer at elevated temperature. The polymer is surrounded by a heated jacket M which may be, for example, an oven. The polymer solution A is spun through a spinneret N under pressure, such as may be caused by a plunger O. The spun filament C enters a cooling bath B. The filament C is then passed over roller D to a heating and stretching zone E, where the filament is stretched. The stretching is accomplished by using a stretch reel F which is at a higher speed than roller D. There is a guidance roller P just prior to the stretching reel F.

The invention will be elucidated by means of the following examples, without being restricted thereby.

EXAMPLES

Example 1

A polyethylene of high molecular weight, with $\overline{M}_w \simeq 1.5 \times 10^6$, was dissolved in decalin at 145° C. to form a 2% wt. solution. This solution was spun trough a spinning nozzle with a spinning aperture of 0.5 mm dia., at 130° C. The filament was passed into a water bath kept at room temperature, where it was cooled. The cooled, 0.7 mm thick filament, which was gel-like in appearance and still contained about 98% solvent, was next passed through a tubular oven heated at 120° C., and stretched, with the use of various stretching ratios. This process is shown in diagram in FIG. 1.

Figure 2:
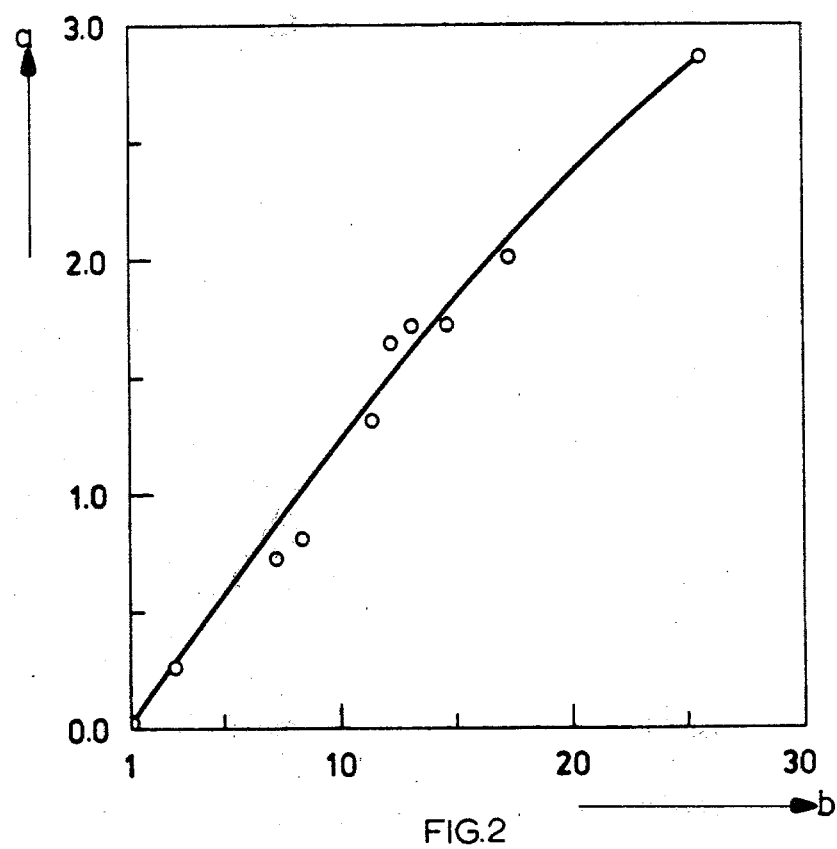
FIG. 2 is a plot of the tensile strength versus stretching ratio of various filaments produced in Example I below.
Figure 3:
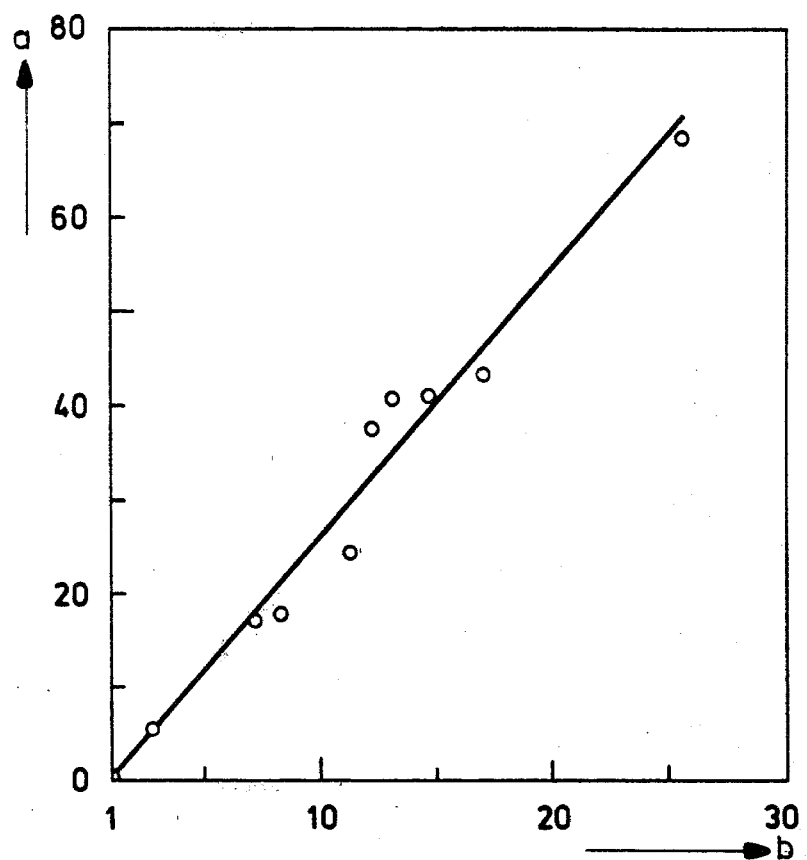
FIG. 3 is a plot of the modulus versus stretching ratio of various filaments produced in Example I below.

FIGS. 2 and 3 show, respectively, the tensile strength and the modulus plotted against the stretching ratio. A modulus of more than 60 GPa and tensile strength of almost 3 can be attained using the process of the present invention whereas the modulus of polyethylene filaments made in the conventional way is 2–3 GPa, and the tensile strength about 0.1 GPa.

The values of modulus and tensile strength of polyethylene filaments made with different stretching ratios as polotted in FIGS. 2 and 3 are given in Table 1.

Polyethylene filaments having a tensile strength of over 1.2 GPa can easily be produced by means of the present process.

TABLE 1

| Expt. | Stretching ratio | Modulus, GPa | Tensile strength GPa |
|---|---|---|---|
| 1 | 1 | 2.4 | 0.09 |
| 2 | 3 | 5.4 | 0.27 |
| 3 | 7 | 17.0 | 0.73 |
| 4 | 8 | 17.6 | 0.81 |
| 5 | 11 | 23.9 | 1.32 |
| 6 | 12 | 37.5 | 1.65 |
| 7 | 13 | 40.9 | 1.72 |
| 8 | 15 | 41.0 | 1.72 |
| 9 | 17 | 43.1 | 2.11 |
| 10 | 25 | 69.0 | 2.90 |
| 11 | 32 | 90.2 | 3.02 |

Example 2

In accordance with the process described in Example 1, a 2% wt. solution of a mixture of equal parts of high-molecular-weight polyethylene, with $\overline{M}_w \simeq 1.5 \times 10^6$, and a high-molecular-weight polypropylene, with $\overline{M}_w \simeq 3.0 \times 10^6$, was spun at 140° C. and stretched at 130° C., using a stretching ratio of 20. The filaments had a tensile strength of 1.5 GPa.

Example 3

In accordance with the process described in Example 1, a 2% wt. solution of isotactic polypropylene, with $\overline{M}_w \simeq 3.0 \times 10^6$, was spun at 140° C. and stretched at 130° C., using a stretching ratio of 20. The tensile strength of the resulting filaments was 1 GPa.

LEGENDS

FIG. 1
A: polymer solution
B: cooling bath
C: wet filament
D: feed reel
E: oven
F: stretching reel

FIG. 2
a: tensile strength GPa
b: stretching ratio

FIG. 3
a: modulus, GPa
b: stretching ratio

What is claimed is:

1. A process for making polymer filaments which have a high tensile strength and a high modulus comprising the steps of,
    (a) spinning a solution of a polymer, ranging from about 1% to about 5% by weight of polymer to solvent, through a spinning aperture to form a filament,
    (b) cooling said filament of step (a) to below the solution temperature of the polymer either in a zone containing a gas without promoting the evaporation of the solvent or with a cooling liquid that does not dilute or extract the solvent in the filament,
    (c) bringing said filament to a temperature between the swelling point of the polymer in the solvent and the melting point of the polymer and,
    (d) stretching the filament that still contains at least about 25% by weight of solvent relative to the polymer, at a stretching ratio of at least 5.

2. A process for making polymer filaments which have a high tensile strength and a high modulus comprising the steps of,
    (a) spinning a solution of polymer ranging from about 1% to about 5% by weight of polymer to solvent through a spinning aperture to form a filament,
    (b) cooling said filament of step (a) to below the solution temperature of the polymer to form a polymer gel in either a zone containing a gas without promoting the evaporation of the solvent or with a cooling liquid that does not dilute or extract the solvent in the filament,
    (c) adjusting the temperature of said polymer gel filament to a value between the swelling point of the polymer and the melting point of the polymer,
    (d) stretching the filament, that still contains at least about 25% by weight of solvent relative to the polymer, at a stretching ratio of at least 5, wherein there is at least a partial evaporation of the solvent, and
    (e) recovering a substantially solvent-free filament.

3. The process of claim 1 or 2 wherein the spun filament is cooled below the swelling point and then stretched at a temperature between the swelling point and the melting temperature.

4. The process of claim 3 wherein a filament containing at least about 100% by weight of solvent relative to the polymer is stretched.

5. Process of claim 3, wherein a polyolefin dissolved in a hydrocarbon solvent is spun to filaments.

6. Process of claim 5, wherein polyethylene is spun.

7. Process of claim 6, wherein the filament is stretched at a stretching ratio of at least 10.

8. Process of claim 6, wherein the filament is stretched at a stretching ratio of at least 20.

* * * * *